United States Patent [19]

Grimes et al.

[11] Patent Number: 5,428,663
[45] Date of Patent: Jun. 27, 1995

[54] INCOMING COMMUNICATIONS FORWARDING TECHNIQUE UTILIZING A CALLED PARTY LOCATION INDICATOR

[75] Inventors: Gary J. Grimes, Thornton; Lawrence J. Haas, Broomfield, both of Colo.

[73] Assignee: AT&T Corp., Murray Hill, N.J.

[21] Appl. No.: 129,795

[22] Filed: Sep. 30, 1993

Related U.S. Application Data

[63] Continuation of Ser. No. 773,468, Oct. 9, 1991, abandoned.

[51] Int. Cl.⁶ .......................................... H04M 11/00
[52] U.S. Cl. .................................... 379/57; 379/58; 340/825.44
[58] Field of Search ..................... 379/56, 57, 58, 59, 379/67; 340/825.44

[56] References Cited

U.S. PATENT DOCUMENTS

| | | | |
|---|---|---|---|
| 4,277,649 | 7/1981 | Sheinbein | 179/18 B |
| 4,642,425 | 2/1987 | Guinn, Jr. et al. | 379/57 |
| 4,658,416 | 4/1987 | Tanaka | 379/57 |
| 4,680,785 | 7/1987 | Akiyama et al. | 379/57 |
| 4,748,655 | 5/1988 | Thrower et al. | 379/60 |
| 4,752,951 | 6/1988 | Konneker | 379/57 X |
| 5,097,500 | 3/1992 | Itoh | 379/63 X |
| 5,109,405 | 4/1992 | Morganstein | 379/89 |

FOREIGN PATENT DOCUMENTS

| | | |
|---|---|---|
| A0152908 | 8/1985 | European Pat. Off. . |
| A0264092 | 4/1988 | European Pat. Off. . |
| 0164661 | 7/1988 | Japan .................................... 379/57 |
| 3001746 | 1/1991 | Japan ........................... H04M 3/42 |
| 2198910 | 8/1987 | United Kingdom .......... H04M 3/42 |

*Primary Examiner*—Curtis Kuntz
*Assistant Examiner*—G. J. Oehling
*Attorney, Agent, or Firm*—John C. Moran

[57] ABSTRACT

A communications signal-transmitting device carried by a communications system user indicates the location of that user relative to other wired or wireless communications devices connected to a communications system. This location indication is utilized by the communications system to forward incoming voice and/or data communications for that user to the other communications device so that the user can receive such communications. As a result, the location of any potential system user is provided and call forwarding for that user is accomplished without the prior art problems associated with activation and deactivation. In the disclosed embodiments which pertain to the forwarding of voice communications in a PBX environment, the communications device is a pager which communicates with the wired or wireless telephone sets connected to the line side of the PBX to provide the PBX with the location of the system user relative to these telephone sets.

17 Claims, 8 Drawing Sheets

TRANSLATION MEMORY INFORMATION

STATUS MEMORY INFORMATION

PHYSICAL ARRANGEMENT OF A WIRED OR WIRELESS COMMUNICATIONS DEVICE

PAGING DEVICE

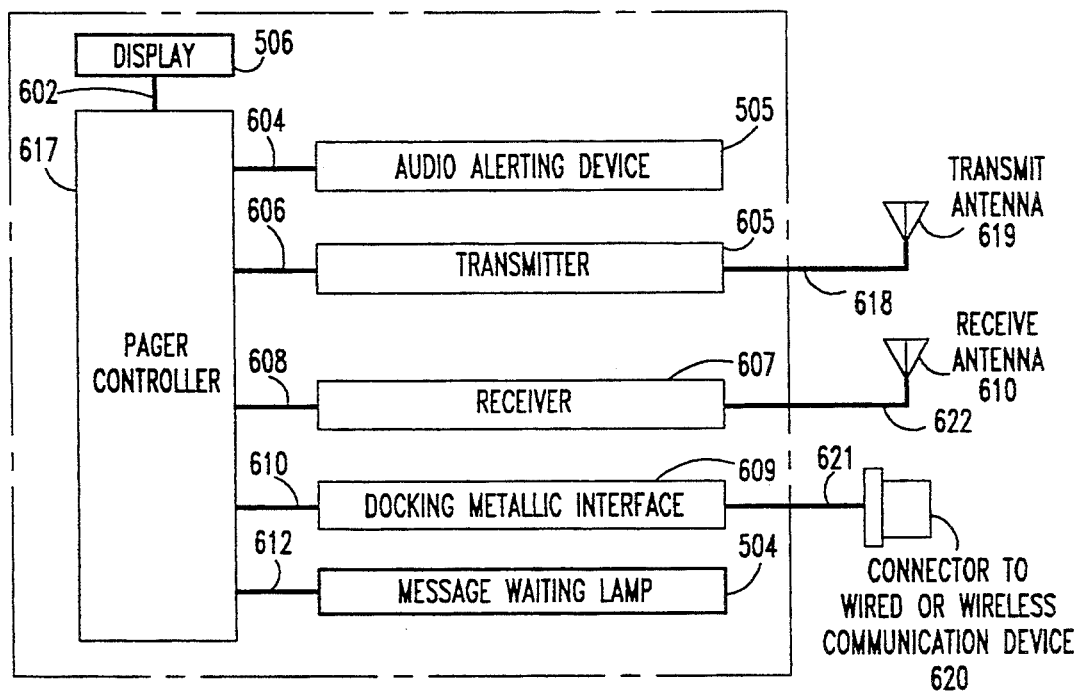
FIG. 6 PAGER BLOCK DIAGRAM
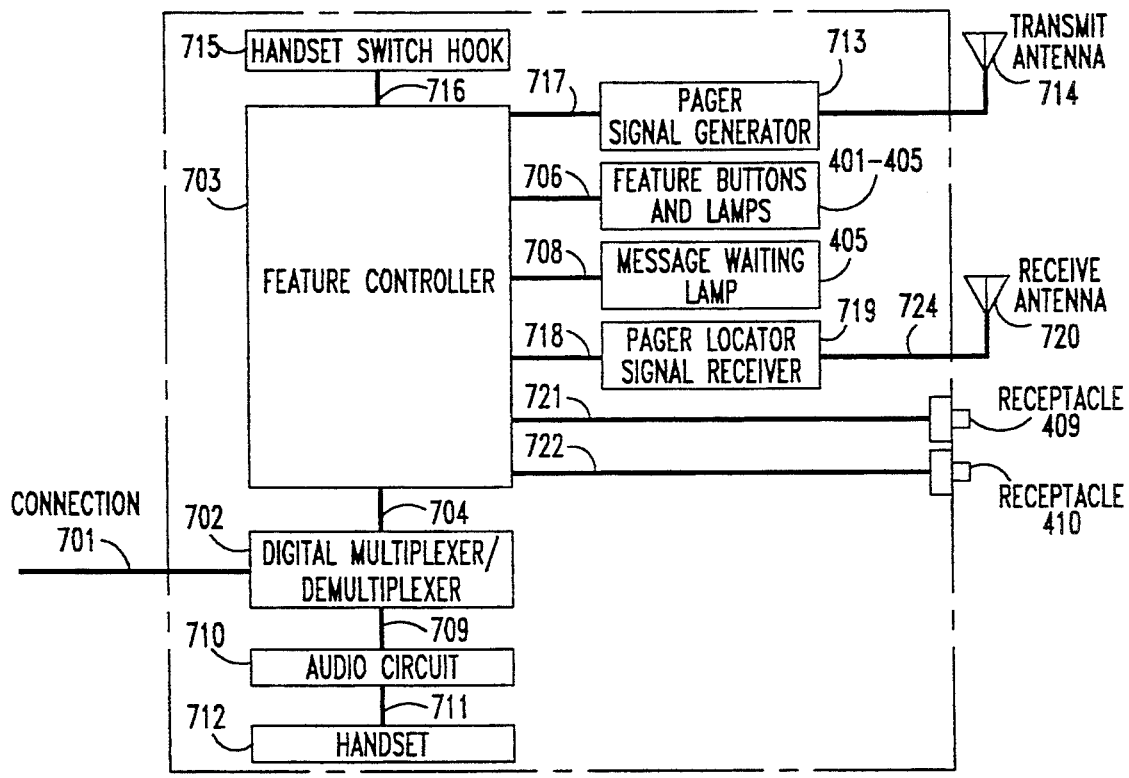
FIG. 7
BLOCK DIAGRAM OF WIRED OR WIRELESS COMMUNICATIONS DEVICE

INCOMING COMMUNICATIONS FORWARDING TECHNIQUE UTILIZING A CALLED PARTY LOCATION INDICATOR

This application is a continuation of application Ser. No. 07/773,468, filed on Oct. 9, 1991, now abandoned.

TECHNICAL FIELD

The present invention relates to a call forwarding arrangement and, more particularly, to such an arrangement wherein a transmitting device allows a communications system to forward calls to a preferred one of a plurality of communications devices that is near to the called party.

BACKGROUND OF THE INVENTION

Call forwarding is a well-known technique where a potential called party who will be away from his/her associated communications device, e.g., a voice and/or data device, can direct a communications system to redirect incoming communications for that called party to another communications device specified by the called party. Most recently, this technique has been updated to provide priority call forwarding wherein redirection of the incoming communications is only provided if the incoming communications originates from one or more priorly identified telephone numbers, extensions or names. This enhancement is known as priority call forwarding. In any event, to activate call forwarding, the prospective called party first provides a predetermined code word to a communications system via a keypad or telephone dial. Next, the communications device to which incoming communications for that called party are to be forwarded is identified by providing its telephone number or extension.

In call forwarding, the other communications device to which incoming communications are forwarded can be either wired or wireless devices. Wired communications devices are those which utilize a "wired" signal-conducting link or path between the communications device and a communications system, such as a central office switch or private branch exchange (PBX). The wired link can take many forms, other than air, including a number of different kinds of metallic conductors or optical fibers. In contrast, wireless communications devices, such as pagers and cellular radio communications devices, utilize air as the wireless path to transport signals to and from the communications system. The distinction between paging and cellular radio devices resides in their communications capabilities. Paging devices are portable, generally one-way communications devices which respond to associated radio signals which are broadcasted by emitting an audible and/or visual alarm to indicate that an incoming communications for the person carrying the pager has been received. The pager may indicate the telephone number from which the incoming communications originated or the person may simply call a predetermined telephone number to receive this information. Radio cellular devices, on the other hand, provide full two-way communications capability and allow a person having such a device to directly respond to incoming communications.

While call forwarding has provided a tremendous benefit in both work and home environments, there are a number of shortcomings. For one, the called party must know in advance the telephone number or extension of the communications device to which incoming communications are to be forwarded. In addition, once activated, the called party must remember to deactivate the call forwarding. Otherwise, calls will be forwarded even when the called party is no longer at that other communications device. Moreover, present call forwarding techniques can be burdensome as an individual who moves about must inform the communications system of each move by updating the telephone number or extension of the communications device to which incoming communications are to be forwarded.

To avoid these shortcomings, individuals have frequently turned to the use of portable, wireless communications devices which may be transported with them and thus have the capability of responding to their incoming communications regardless of their location. Pagers or cellular radio devices, however, are not panaceas. For one, such devices and especially cellular radio devices are expensive. In addition, in many situations, such as manufacturing, hospital, and general office environments, it is often difficult, if not impossible, to meet the requirements for high-quality, two-way wireless communications from any location due to the presence of noise and other communications-degrading influences. While pagers are less expensive, they may be inconvenient for many applications where an immediate response to an incoming communications may be necessary and the reality of having the called party initiate a call to each calling party is not satisfactory.

It would, therefore, be extremely desirable if the present techniques for call forwarding could be improved to overcome the shortcomings associated with this communications feature.

SUMMARY OF THE INVENTION

The present invention overcomes the limitations of present call forwarding capabilities by utilizing a portable communications device which indicates the location of the person carrying the device to a communications system. In response to such an indication, the communications system can redirect incoming communications for the person carrying the portable device to another wired or wireless communications device that is close to that person. As a result, the location of any potential called party can be continuously provided and the problems associated with activating and deactivating previous call forwarding capabilities are avoided. Advantageously, this arrangement is suitable for forwarding incoming voice and/or data communications.

In the disclosed embodiment, which pertains to the forwarding of voice communications in a Private Branch Exchange (PBX) environment, the portable communications device is a pager which communicates with the wired or wireless communications devices connected to the station side of the PBX via a wired or wireless communications link. This communication, which indicates the location of the person relative to such wired or wireless two-way voice communications devices, is utilized by the control complex of the PBX to automatically forward incoming calls for the person carrying the pager to a proximate voice communications device from which that person may answer the call. Advantageously, this technique may be melded to operate in an integrated fashion with a variety of other communications capabilities, such as voice mail, send all calls, and priority call forwarding, and may also be activated or deactivated as desired.

BRIEF DESCRIPTION OF THE DRAWING

FIG. 6 is a block-schematic diagram of the pager of FIG. 5;

FIG. 7 is a block-schematic diagram of the wired or wireless communications device of FIG. 4.

DETAILED DESCRIPTION

Figure 1:
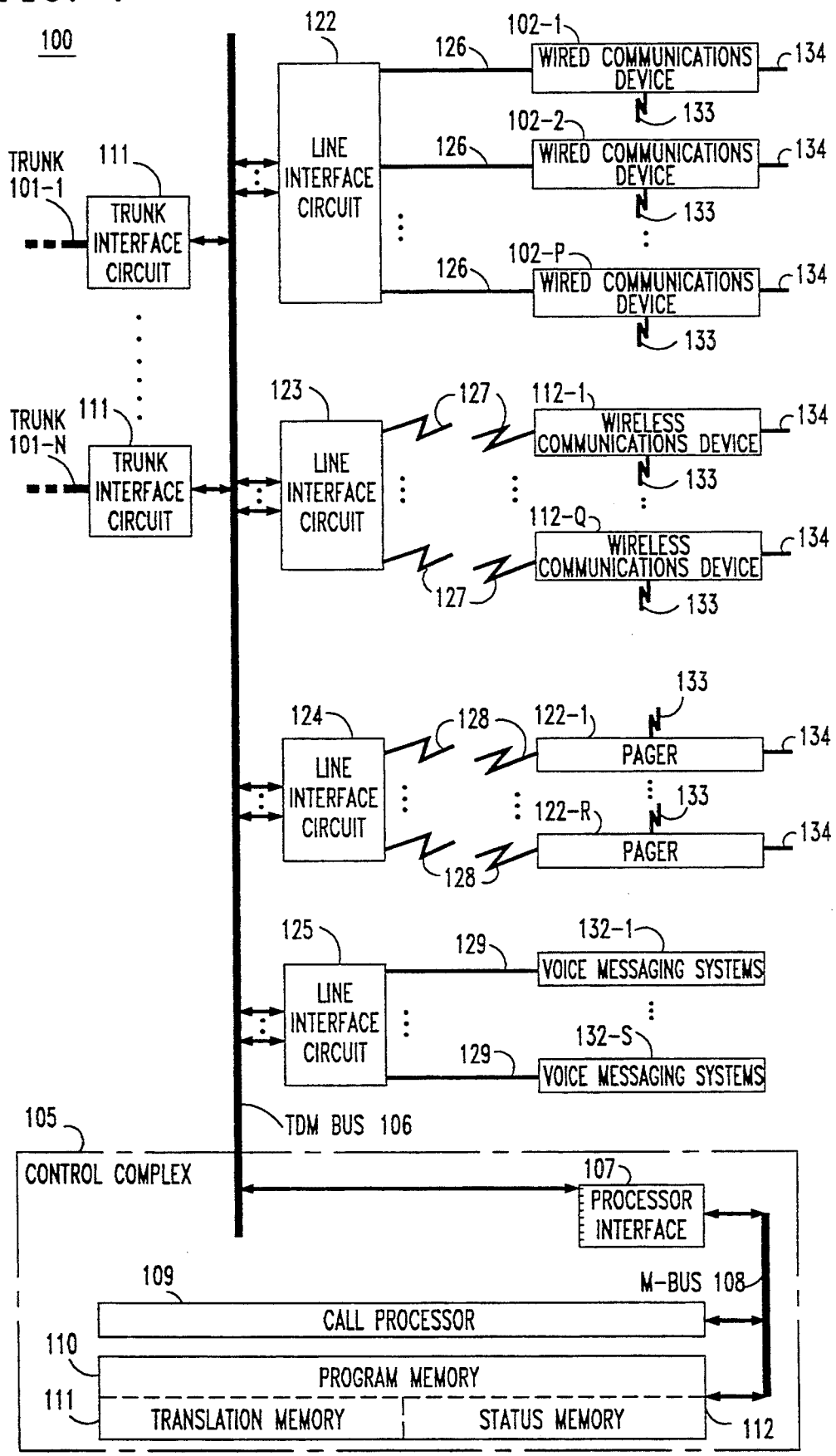
FIG. 1 is a block-schematic diagram of an exemplary communications system incorporating the present invention.

FIG. 1 shows an exemplary application of the present invention wherein PBX 100, for example, an AT&T Definity ® telecommunications system (Definity is a registered trademark of AT&T) has its "trunk" side connected to a plurality of trunks 101-1 through 101-N via trunk interface circuits 111 and its "line" side connected to a plurality of wired communications devices 102-1 through 102-P and wireless communications devices 112-1 through 112-Q via line interface circuits 122 and 123, respectively. The trunks connect to an external communications network (not shown) which may be either a public or private network. Each of the variables P and Q is a predetermined integer and since a PBX may be designed to be blocking or nonblocking, the number of trunks, N, is less than or equal to the total number of wired and wireless communications devices, P+Q. A plurality of pagers 122-1 through 122-R and a plurality of voice mail systems 132-1 through 132-S are also connected to the line side of PBX 100 via line interface circuits 124 and 125, respectively. Each voice mail system has the capability of providing voice announcements to calling parties in certain circumstances, such as when the called party does not answer. The mix of wired and wireless communications devices, pagers and voice mail systems is arbitrary so that the integers P, Q, R and S can each vary to suit different applications. Furthermore, it should, of course, be understood that while, in the illustrative embodiment of the present invention, the wired or wireless communications devices provide full two-way voice communications capabilities, such devices can also provide a myriad of other communications functions and may include personal computers, video terminals, facsimile machines, environmental sensing devices, such as smoke detectors, etc. The connection between each port on line interface circuits 122 and 125 to its associated wired communications device and voice mail system is respectively provided by one of wired communications links 126 and 129. In similar fashion, the connection between each port on line interface circuits 123 and 124 to its associated wireless communications device and pager is respectively provided by one of the wireless communications links 127 and 128.

Each pager provides signal receiving capability and is associated with a respective one of the wired or wireless communications devices so that a calling party desiring to reach a called party can dial either the telephone number associated with that called party's (wired or wireless) two-way communications device or pager. In addition, pursuant to this embodiment of the present invention, the pager is provided with limited transmission capability wherein a prospective called party who is away from his/her associated wired or wireless communications device can signal call processor 109 within control complex 105 of a desire to have all calls or calls from a predetermined list of callers forwarded to some other wired or wireless communications device not normally associated with this called party. This other wired or wireless communications device is one that is close to the called party's location and may change with time. A prospective called party's desire to initiate such call forwarding and the identification of the wired or wireless communications device that is near to the called party at any time is communicated to call processor 109 via signals that are initially coupled between any paging device and its nearby wired or wireless communications devices. This coupling is provided, as shown in FIG. 1, via at least one wireless path 133 or through at least one wired path 134. As will be discussed more fully hereinbelow, the wireless paths may couple any of a variety of signals, such as radio or infrared signals, and any wired path is established by placing the paging device in an electrical receptacle in a wired or wireless communications device.

Each of the wired and wireless communications devices in FIG. 1 is connected to a "port" of an associated one of line interface circuits 122 and 123, respectively. In similar fashion, each of the pagers and voice mail systems is respectively connected to a port on an associated one of line interface circuits 124 and 125. Typically, each line interface circuit has a plurality of ports so that the total number of line interface circuits is less than the total number of wired and wireless communications devices, pagers and voice mail systems, i.e., P+Q+R+S.

PBX 100 provides a communications system switching interface for incoming, outgoing and internal communications. "Incoming" communications are those which originate within the external communications network and are destined for at least one of the wired or wireless communications devices. "Outgoing" communications are those which originate from one of these communications devices and are destined for some other communications device within the external communications network (both of the latter not shown). In FIG. 1, "internal" communications are those which originate from one of the communications devices and terminate on a different one of these communications devices. Of course, as is well-known, PBX 100 can be one PBX in a network of interconnected PBXs and, in such situations, internal communications can also originate from and terminate on communications devices in different PBXs in the network of PBXs.

For any of the foregoing types of communications, signalling information has to be coupled to the destined wired or wireless communications device. This coupling of signalling information is through the control complex 105 but the voice/data communications which follow this signalling transfer is not coupled to the control complex, but rather is transferred directly between the trunk interface and line interface circuit by timedivision-multiplexed (TDM) bus 106. Signalling for incoming communications, received via a trunk and its associated trunk interface circuit, are routed to control complex 105 via the TDM bus. Within the control complex, this signalling is serially coupled through processor interface 107 and M-bus 108 to call processor 109. Processor 109 utilizing software stored in program memory 110 and specific system information stored in translation memory 111 and status memory 112, processes the received dialed digits for the incoming communications to provide signalling to the destined communications device via its associated line interface circuit and communications link. This connection to the associated line interface circuit is provided via M-bus 108, processor interface 107 and TDM bus 106. Within the associated line interface circuit, the incoming signalling is routed to the port connected to the communications link extending to the destined communications device. Similarly, signalling for outgoing communications is outputted to the associated communications link and line interface circuit and then is routed to the control complex via the TDM bus. Within the control complex, the signalling for outgoing communications is serially routed through processor interface 107, M-bus 108 and call processor 109. Within the call processor, the dialed digits are analyzed utilizing software within program memory 110, specific system information stored in the translation and status memories and a signalling interconnection is provided to one of the trunks and its associated trunk interface circuit in accordance with a predetermined routing scheme. This interconnection is provided via the M-bus, processor interface and TDM bus. Internal communications between at least two wired or wireless communications devices are processed in much the same fashion as just described with the call processor determining the associated line interface circuit associated with the destined communications device. The signalling connection to and from the call processor is provided via the TDM bus, processor interface and M-bus. If, however, the destined communications device in an internal communications is in another PBX networked with PBX 100, then the call processor routes the signalling to a preselected trunk and trunk interface circuit via the M-bus, processor interface and TDM bus. Within the other PBX, communications services are provided as if the communications originated within that PBX.

Figure 2:
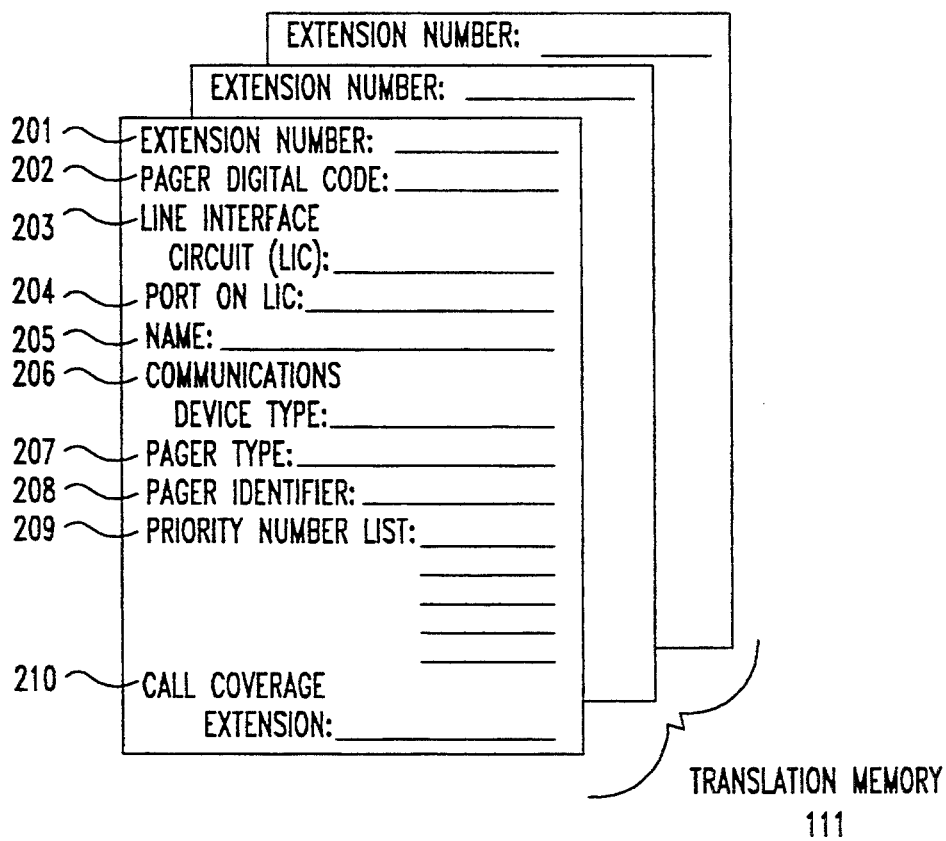
FIGS. 2 and 3 are representations of the translation and status data respectively stored in the translation and status memories of the system of FIG. 1.

FIG. 2 shows the information in translation memory 111 utilized pursuant to the present invention. Of course, such memories also store other information in order to provide numerous other communications services. The first item in the translation memory, utilized by the disclosed embodiment of the present invention, is the extension number 201. This number is used to identify both the wired or wireless communications device along with any pager associated with this extension number. The pager digital code 202 is the digital code word to which the pager associated with extension number 201 is responsive. A given pager will be responsive to only one digital code word 202 which is transmitted by the associated line interface circuit 124. While only one line interface circuit 124 is shown in FIG. 1, it should be understood that there is typically a plurality of these circuits as well as a plurality of line interface circuits linking each of the following: wired communications devices, wireless communications devices, and voice messaging systems. In any event, the line interface circuit (LIC) number 203 and the port 204 on this LIC are used by the present invention to identify the physical location of the communication system port interfacing the wired or wireless communications device. Name 205 is used to identify the user's name normally associated with extension number 201. The communications device type 206 is used to identify the type of communications device associated with extension number 201, so that the proper signaling sequence for this communications device can be implemented. Similarly, the pager type 207 is used to identify the type of pager so that the proper signaling sequence for this pager can be implemented. The pager code word 208 is used, for security purposes, to verify that the proper pager is responding to any page. This pager code word is automatically transmitted by the pager whenever it transmits signals to communications system 100. The priority number list 209 is a list of extensions or users' names to which the pager will respond when the "priority page" feature, as will be subsequently described, is activated. Finally, call coverage extension 210 identifies the telephone number or extension of the communications device to which calls directed to extension number 201 are forwarded when call coverage, a well-known feature in communications systems, is activated.

Figure 3:
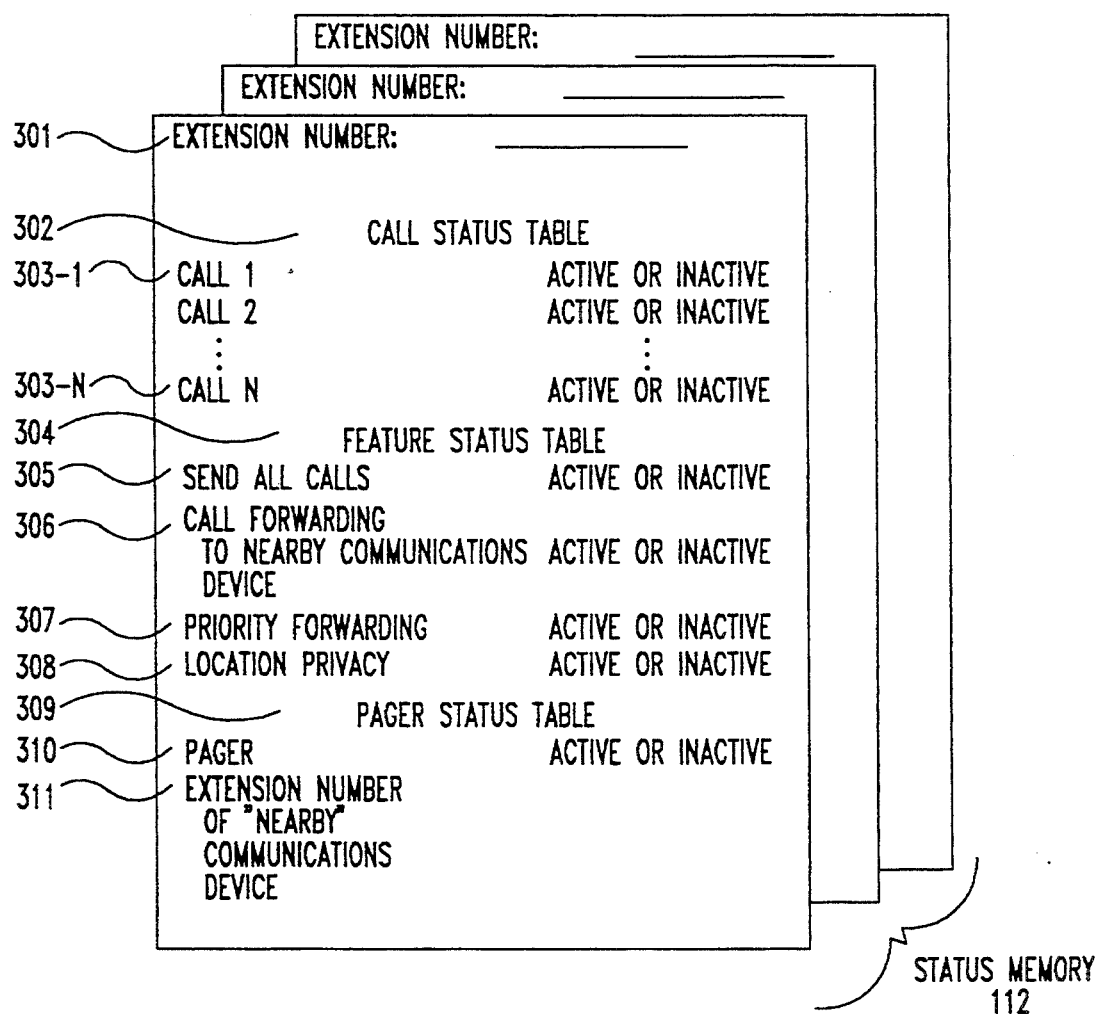

FIG. 3 shows the information in status memory 112 needed to implement the present invention. Extension number 301 is analogous to extension number 201 of FIG. 2. The remainder of the status memory information is divided into three tables—the call status table 302, the feature status table 304, and the pager status table 307. Call status table 302 sets forth a list of entries which indicate whether any one of a predetermined integer number, N, of simultaneously receivable calls for an extension number is active or inactive at any given time. These entries are designated as 303-1 through 303-N. Feature status table 304 includes entries 305 through 309.

Entries 305 and 306 respectively indicate whether the send all calls and call forwarding to a nearby communications device features are active or inactive. Send all calls is a well-known communications capability wherein calls to a called party's wired or wireless communications device are directed to a predetermined call coverage device. This call coverage device can be a wired or wireless two-way communications device and, as disclosed in a co-pending application by the present inventors and assigned to the present assignee, filed May 10, 1991, and entitled "Integration of Wireless Paging in a Communication System," can be a pager. A typical situation where this capability is used arises when a call to a called party is directed to that called party's secretary or assistant. Call forwarding to a nearby communications device, pursuant to the present invention, is a communications feature wherein incoming communications for a called party are directed to a communications device that is "near" to the called party so that he/she can answer the incoming communications at any given time. Send all calls is similar to call forwarding to a nearby communications device and, indeed, is a species thereof. The difference between send all calls and call forwarding to a nearby communications device is that while the identification of the call coverage device can be changed in the send all calls feature, such changes are generally infrequent. Call forwarding to a nearby communications device is associated with a more dynamic situation which contemplates that the prospective called party will be moving about and the identification of the call coverage device may be frequently changed. The priority paging feature, designated by entry 307, is a species of call forwarding to a nearby communications device. When the priority paging feature is active for a given pager, call destined for the wired or wireless communications device associated with that pager will be forwarded to the currently designated call coverage device that is near to the called party at any given time only if the incoming communications originated from one of the predetermined list of calling numbers in priority number list 209 of FIG. 2. In this disclosed embodiment, the call coverage device that is near to the called party at any given time is that wired or wireless communications device which is nearest to the called party's pager. Entry 308 indicates whether the location privacy feature is active or inactive. This feature can only be activated when the call forwarding to a nearby communications device feature is also active. With location privacy activated, the fact that the incoming communications has been forwarded to the call coverage device will not be given to any users of the communications system including the call coverage party. When the privacy feature is inactive, the call coverage party can be advised of the call forwarding via a display which indicates that the incoming call is not for the call coverage party but for the called party who has activated his/her forward calls to the nearest communications device feature. The pager status table 309 has entries 310 and 311. Entry 310 indicates whether the pager is active or inactive and entry 311 indicates the extension number of the wired or wireless communications device that is currently nearest to the individual associated with the extension number designated in entry 301. Accordingly, if the call forwarding to a nearby communications device feature is active, incoming communications to the extension number designated in entry 301 will be redirected to the extension number designated in entry 311.

Figure 4:
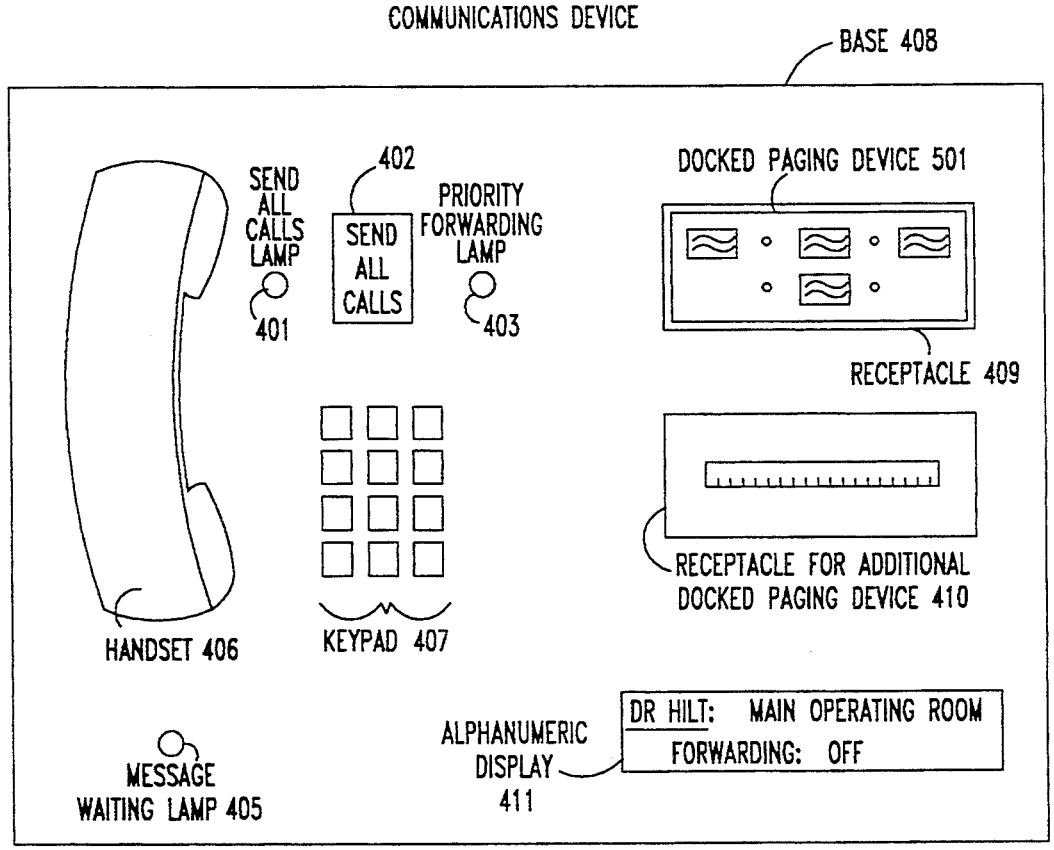
FIG. 4 is a representation of the physical arrangement of an exemplary wired or wireless communications device possessing full two-way communications capabilities for use in the communications system of FIG. 1.

The physical arrangement of an exemplary wired or wireless communications device is shown in FIG. 4. The communications device has several lamps and buttons in addition to the base 408, the keypad 407, and the handset 406. The send all calls button 402 is used to activate the send all calls feature and toggles between the active and inactive states of this feature with each button depression. The send all calls lamp 401 is used to alert any user of the communications device that the send all calls feature is active as such notification is important since when this feature is active ringing of the communications device in response to an incoming call is suspended. The priority forwarding lamp 403 is used to alert the user of the communications device that this feature has been activated. The message waiting lamp 405 alerts the user of a retrievable message, e.g., a voice mail message. Lamp 405 is typically controlled by a communications system to be on when there is a message waiting and be off when either there are no messages to be retrieved or when all such messages have already been retrieved.

FIG. 4, in accordance with one embodiment of the present invention, also incorporates two receptacles 409 and 410, each incorporating convention electrical connectors, for providing wired path 134 shown in FIG. 1. Such electrical connectors can also be advantageously used to charge a pager's battery. Once a pager is inserted into a receptacle, the call forwarding to a nearby communications device feature is activated. Such activation can occur by the mere insertion of the pager into a receptacle or by depressing button 510 of FIG. 5. The latter case is preferred when pager battery charging is provided in receptacles 409 and 410 so as to provide for such charging without activation of the call forwarding to a nearby communications device feature for the extension 301 associated with the inserted pager. In any case, if it is desired that the call forwarding to a nearby communications device feature be activated for the extension number 301 associated with the inserted pager, a signal from the pager will be coupled through the pager-receiving wired or wireless communications device to call processor 109 of FIG. 1. This signal is different for each pager and, hence, is different for each of the extension numbers in PBX 100 designated by an entry 301 in FIG. 3. As a result, upon receiving any pager-transmitted signal, call processor 109 can identify the associated extension number 301 and changes entry 306 to the "active" state for this extension number. In addition, call processor 109 determines the extension number of the pager-receiving wired or wireless communications device from knowledge of the port on the line interface circuit, i.e., entry 204, through which this pager-transmitted signal was received. The extension number of the nearby communications device determined from entry 204 is stored in entry 311 for each extension number 301 for which the call forwarding to a nearby communications device feature has been activated.

Receptacle 409 shows a paging device 501 presently "docked" in it and receptacle 410 is presently empty to show the electrical connector. Alphanumeric display 411 displays the present locations of the parties associated with this wired or wireless communications device and the status of the call forwarding to a nearby communications device feature for this device.

While activation of the call forwarding to a nearby communications device feature has just been described via docking of a pager in a wired or wireless communications device so as to establish one of the wired paths 134 of FIG. 1, such activation can also be accomplished via signals transmitted by a pager to nearby wired or wireless communications devices via wireless paths 133 of FIG. 1. This alternative arrangement may, at times, be desirable. In the descriptions of FIGS. 6 and 7 which follow, it will be assumed that both modes of call forwarding to a nearby communications device feature activation are possible. As a result, both the pager and wired or wireless communications device will respectively possess these capabilities.

Figure 5:
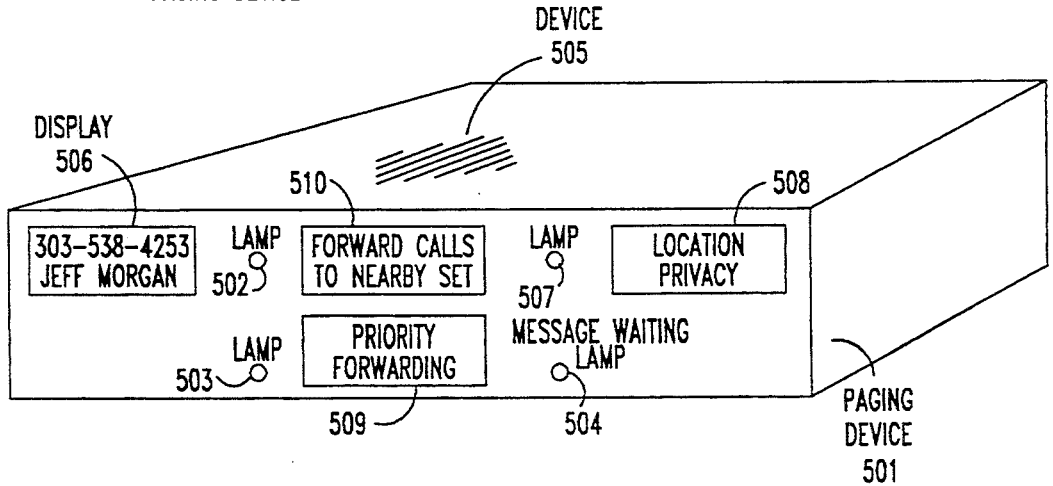
FIG. 5 is a representation of the physical arrangement of an exemplary pager for use in the communications system of FIG. 1.

FIG. 5 shows a typical paging device physical layout pursuant to the disclosed embodiment of the present invention. Paging device 501 includes an alphanumeric display 506 capable of displaying both the number associated with a calling party as well as the name or other identifying information of such a party. Paging device 501 also includes a message waiting lamp 504 which when lit indicates that there is "unopened" voice mail for the person associated with the pager. In lieu of such a lamp, the function of the message waiting lamp can be provided by an icon which is selectively activated or illuminated on display 506. Audio alerting device 505 alerts the pager user to a new incoming message by emitting one or more audible tones.

Paging device 501 also has a forward calls to nearby set button 510 which toggles between an active and inactive state as indicated by lamp 502. This button is useful to activate the call forwarding to a nearby communications device feature, as previously described, and is necessary for activating this feature using wireless paths 133 of FIG. 1. Depression of this button causes the pager to transmit a signal via either paths 133 or 134. Paging device 501 also has a priority feature button 509 which when depressed activates the priority forwarding feature in which only calls from predetermined calling numbers are forwarded to the nearby communications device. The active or inactive state of the priority forwarding feature is indicated by lamp 503. The location privacy button 508 is used to disable all user output devices, including the displays on wired and wireless communications devices 411 of FIG. 4 and the voice messaging systems 132-1 through 132-S of FIG. 1, from conveying the location of the paging device user to other users of the communications system.

FIG. 6 shows the pager block diagram. Pager controller 617 receives information from PBX 100 to activate its alerting device, display and lamps via receive antenna 610, lead 622 and receiver 607 and transmits information to the wired or wireless communications device in PBX 100 to activate the call forwarding to a nearby communications device feature via transmitter 605, lead 618 and transmit antenna 619. In FIG. 6, a single pager antenna could be used and such use of a single antenna is typical of pagers wherein the transmit and receive radio frequencies are the same or closely spaced. If substantially different transmit and receive frequencies are used, then separate receive and transmit antennas can be employed as shown. Of course, in lieu of radio communications between PBX 100 and the pager, infrared or other wireless communications may be used.

Transmit antenna 619 is used to send signals to the wired or wireless communications devices to activate the call forwarding to a nearby communications device feature and to identify the closest one of such devices. While it is envisioned that signals front the pager could be received by several wired or wireless communications devices, identification of a single such device as the "nearby" communications device for the call forwarding to a nearby communications device feature can be accomplished using a variety of well-known schemes including a comparison in PBX 100 of the signal strength of the pager-transmitted signal which has been received by different wired or wireless communications devices. Selection of the wired or wireless communications device as the nearby communications device can then be determined by merely selecting the wired or wireless communications device receiving the strongest pager-transmitted signal. Once the nearby communications device has been determined, the operation of call processor 109 is identical to that described in respect to pager docking in receptacle 409 or 410.

Signals received on the receive antenna 610 come from line interface circuits 124 and are used to signal incoming communications in ways commonly employed in the art. Signals received on antenna 610 might also originate from a nearby wired or wireless communications device which indicate that a priorly transmitted signal from this pager has been processed to initiate the call forwarding to a nearby communications device feature for the associated wired or wireless communications device. Thus, for lamp 502 of FIG. 5 on paging device 501 to be lit requires that the paging device user so select by toggling forward calls to nearest set button 505 and that paging device 501 receive signals from a nearby wired or wireless communications device confirming that the request has been properly processed by the communication system.

Pager controller 617 is connected to display 506 by conductor 602. Conductor 602 couples calling party number and/or other alphanumeric information to the display. Audio alerting device 505 of FIG. 5, e.g., a loud speaker, alerts a pager user of incoming calls and is connected to the pager controller via conductor 604. The docking metallic interface 609 is connected to pager controller 617 by means of conductor 610 and to an electrical connector 620 by means of conductor 621. The docking metallic interface 609 and the electrical connector 620 provide a wired path 134 between the pager and the pager-receiving wired or wireless communications device receptacle 409 or 410. Accordingly, if a pager user desired that his/her incoming communications be forwarded to a nearby wired or wireless communications device, the user would only need to place the pager in that nearby wired or wireless communications device receptacle and/or depress the forward calls to nearest communications device button 505 of FIG. 5. Alternatively, this forwarding could be accomplished by depressing button 505 to transmit a wireless signal from transmit antenna 619. Once the call forwarding feature has been activated via either a wired or wireless signal transmission mechanism, the pager user can change the state of the priority and location privacy features by activating buttons 509 and 508 respectively of FIG. 5. Pager controller 617 also activates message waiting lamp 504 via conductor 612 in response to signals for that pager from line interface circuit 124 that there is an unretrieved electronic message for the person(s) associated with the pager.

The block diagram of a wired or wireless communications device is shown in FIG. 7. Connection 701 connects digital multiplexer/demultiplexer 702 to the associated LIC port. In the case of a wired communications device, connection 701 to the associated LIC is a wired one, while in the case of a wireless communications device, connection 701 is a wireless one to the wireless communications device transceiver and thence is a wired connection to the associated LIC port. Digital multiplexer/demultiplexer 702 separates voice or data from the signaling information. Voice information coupled from the associated line interface circuit port is provided to audio circuit 710 via conductor 709. Within the audio circuit, the voice information is amplified and processed and thence coupled through conductor 711 to handset 712. In similar fashion, audio information received by the microphone (not shown) within handset 712 is also coupled by conductor 711 to audio circuit 710.

Feature controller 703 receives signaling information from digital multiplexer/demultiplexer 702 via conductor 704. The handset switch hook 715 couples information to feature controller 703 as to whether the handset is on-hook or off-hook via conductor 716. Feature controller 703 also receives information through conductor 706 from the feature button 402 and lamps 401, 403 and 405 of FIG. 4. Message waiting lamp 405 is activated or deactivated by feature controller 703 using signals coupled through conductor 708. Pager signal generator 713 outputs signals to antenna 714 which is used by the pager to confirm that the call forwarding to a nearby communications device feature is operational and to light lamp 502. Such signals can also be used to activate the location privacy and priority forwarding lamps 507 and 503.

Pager locator signal receiver 719 receives signals from receive antenna 720 over conductor 724. These signals are received front nearby pagers for the purposes of initiating the call forwarding to a nearby communications device feature for such pagers. Advantageously, receiver 719 can also receive information from a pager regarding the status of the location privacy features and priority features and relay this information along with the forward to a nearby communications device request to the associated line interface circuit via conductor 718, feature controller 703, conductor 704, digital multiplexer/demultiplexer 702, and connection 701. Pager locator signal receiver 719 may advantageously also include means for classifying signal strength and output a signal representative of this strength which is coupled through to connection 701. Consequently, if different wired or wireless devices simultaneously receive wireless signals from a single paging device, call processor 109 can merely select that wired or wireless communications device as the nearby communications device.

The wired or wireless communications device can also communicate with a paging device by means of receptacles 409 and 410, as previously described. Such receptacles are connected to feature controller 703 via conductors 721 and 722, respectively.

The operation of the present invention may be further understood by tracing the processing of an exemplary incoming communication as shown in the flow charts of FIGS. 8–12. Such figures describe the sequence of operations of call processor 109 of FIG. 1.

Figure 8:
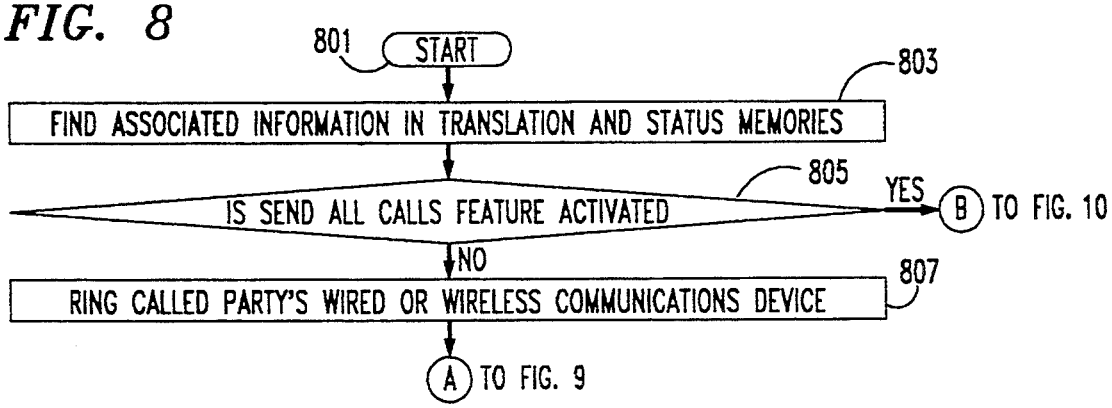
FIGS. 8–12 are flow charts depicting the sequence of operations provided by call processor 109 of FIG. 1 in accordance with the present invention.

Call processing begins at step 801 of FIG. 8. At step 803, processor 109 examines the received dialed digits and finds the associated information in the translation memory 111 and the status memory 112. Call processing then continues on to decision step 805 which determines if the send all calls feature is activated by examining entry 305 of FIG. 3 for the extension number 301 matching the received dialed digits. If the answer is yes, then call processing proceeds via connector B to the send call to coverage step 912 of FIG. 9 and thence to step 1001 of FIG. 10. If the answer at decision step 805 is no, processing proceeds to decision step 807 which rings the called party's associated wired or wireless communications device based on the received dialed digits. Processing next proceeds through connector A to step 902 of FIG. 9.

Figure 9:
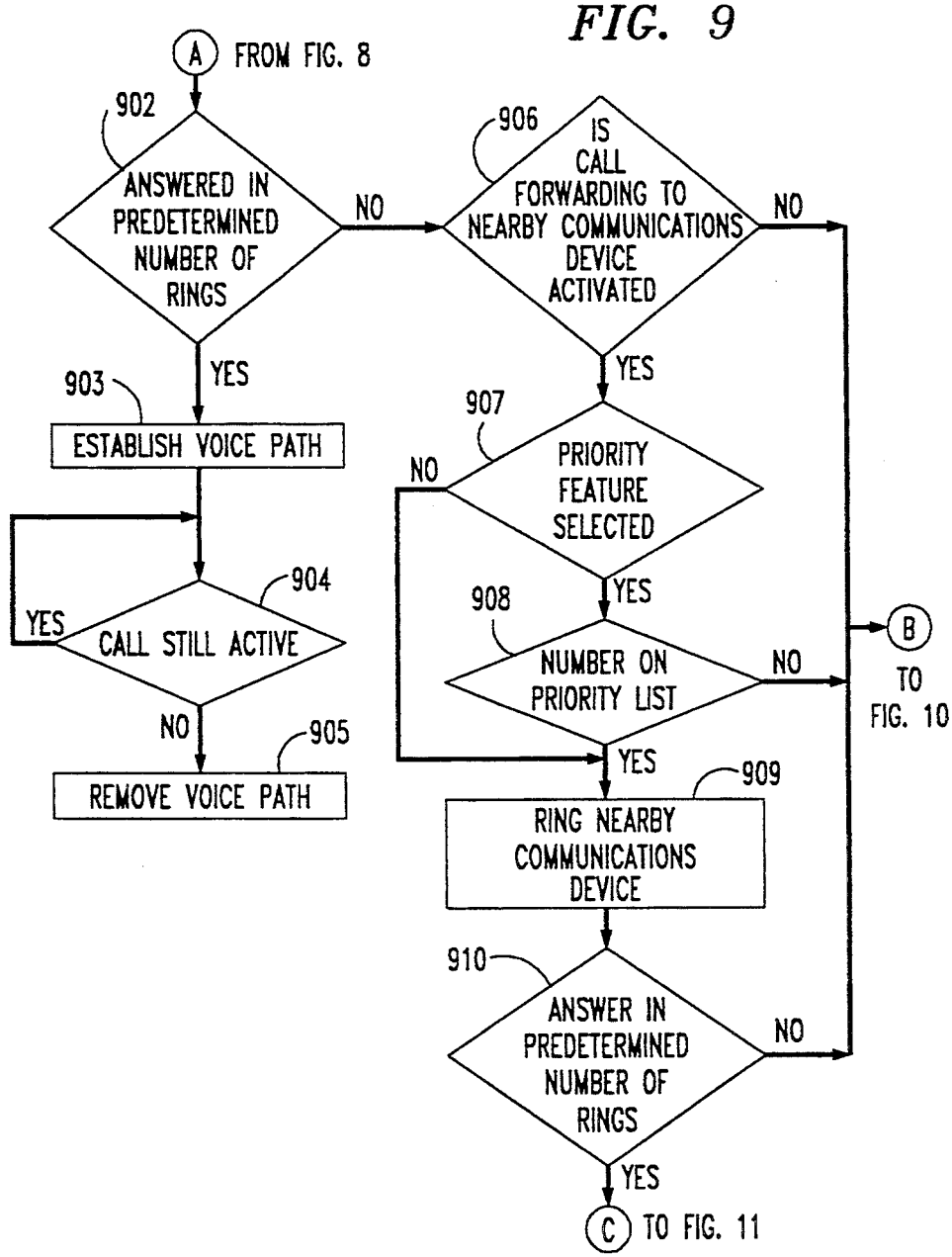
Figure 10:
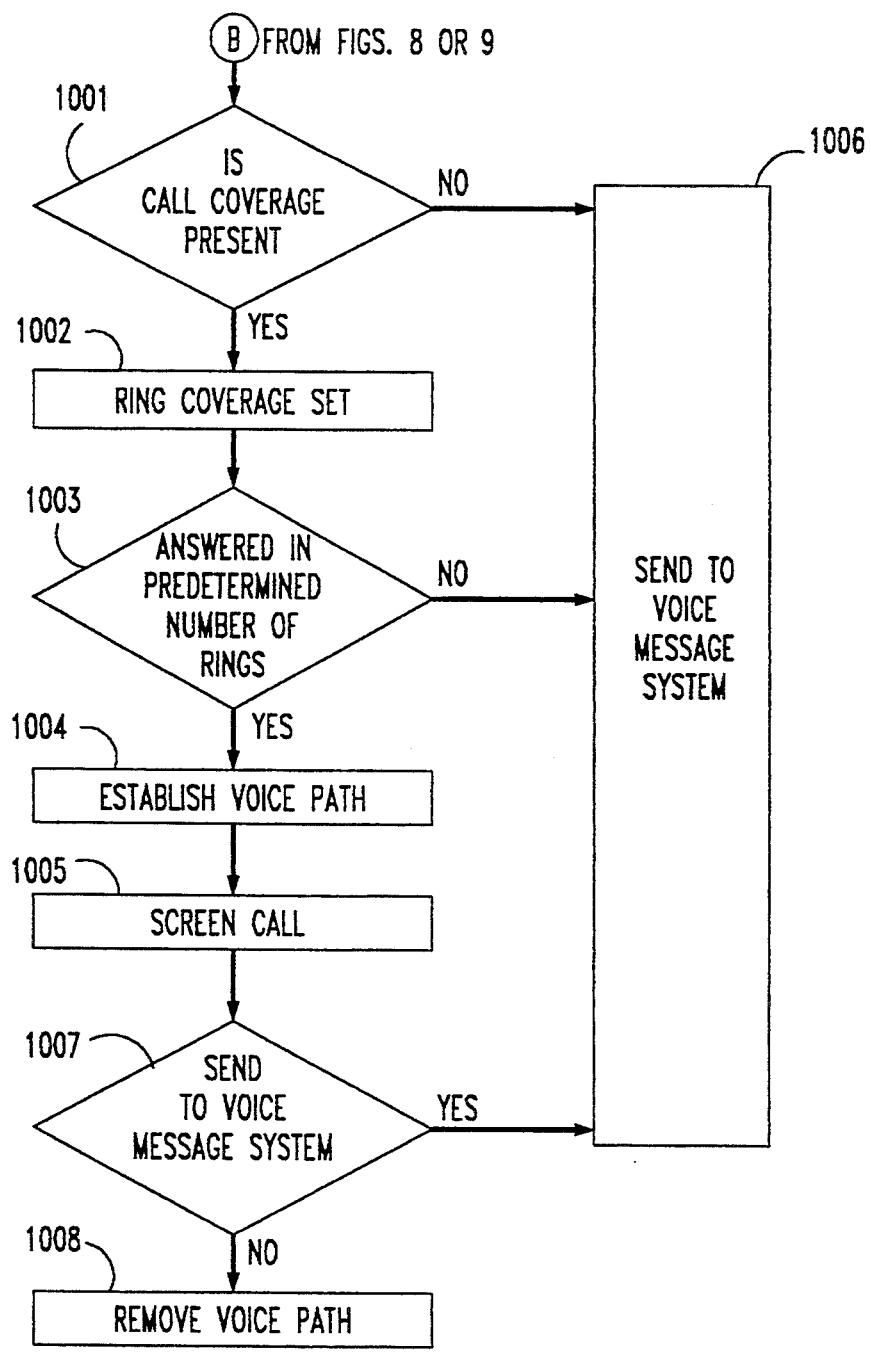
Figure 11:
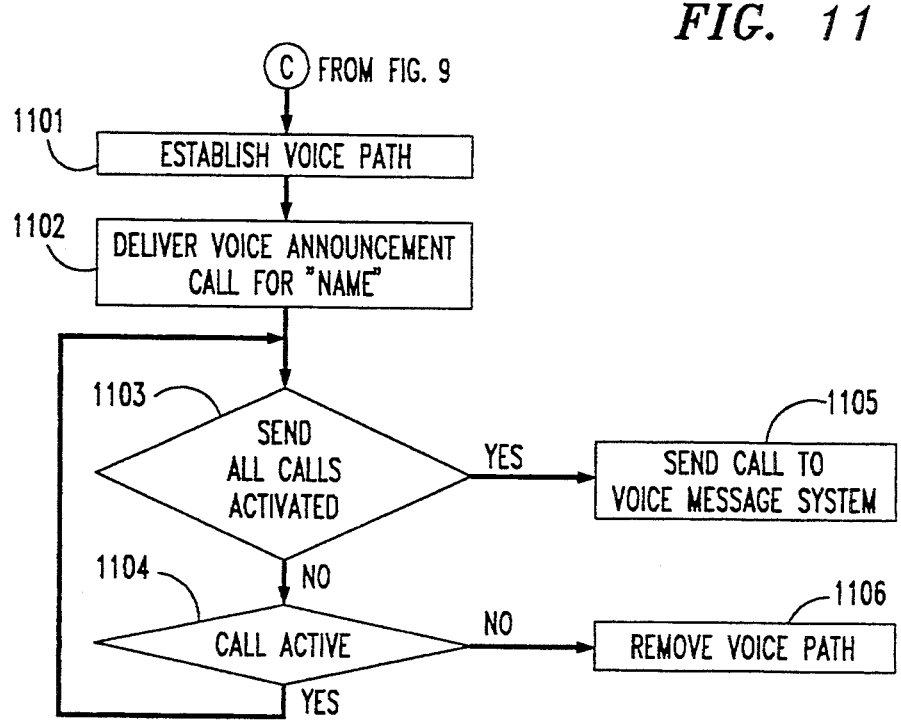

Referring to FIG. 9, at decision step 902 if the incoming communication is answered in a predetermined number of rings, we establish a voice path at step 903 and pass control to decision step 904. If the call is still active at step 904, control loops back on step 904 until the answer at this step is no and control is passed to step 905 where the voice path is removed and call processing is concluded.

If the answer to decision step 902 is no, we jump to decision step 906 and determine if the call forwarding to a nearby communications device feature is activated by examining entry 307 for the extension number 301 matching the received dialed digits. If the answer at step 906 is no, processing continues through connector B to step 1001 of FIG. 10. If the answer at step 906 is yes, call processing proceeds to decision step 907 which determines if the priority forwarding feature has been selected by examining entry 307 for the extension number 301 matching the received dialed digits. If the answer is no at step 907, the nearby communications device specified by entry 311 is rung at step 909. If the answer at step 907 is yes, call processing proceeds to decision step 908 which determines if the number of the calling party is on priority number list 209 for the extension number 201 matching the received dialed digits. If the answer at decision step 908 is no, then call processing is passed through connector B to step 1001 of FIG. 10. If the answer at step 908 is yes, then the nearby communications device is rung at step 909. If the incoming communications redirected to this device is not answered in a predetermined number of rings, as shown in step 910, call processing proceeds through connector B to step 1001 of FIG. 10. If this is not the case, then call processing proceeds through connector C to step 1101 of FIG. 11.

Call processing continues as we establish a voice path at step 1101 and preferably pass control to step 1102. At step 1102, an announcement from one of voice messaging systems 132-1 through 132-S is delivered to the nearby communications device which identifies that the call is for the called party associated with the pager who has activated his/her call forwarding to a nearby communications device feature and not the person otherwise associated with the nearby communications device, i.e., entry 205, listed for the extension number of the nearby communications device. Such announcements can take several forms including voice, text, etc., and in the case of a text announcement can be provided by forwarding the text to a display associated with the nearby communications device. Such displays (not shown in the Figures) are commonly provided in many of AT&T's voice communications devices used in PBX applications. The announcement provided at step 1102 could, for example, display the name of the person with the paging device and not the name of the person normally associated with the nearby communications device so that the latter will recognize that the incoming communications is for the pager user who is close by. At this point, call processing proceeds to decision step 1103 which determines if the send all calls feature is activated for the nearby communications device. This could be desirable if the owner of the paging device does not want to take the call. If the answer at decision step 1103 is yes, then the call is sent to one of the voice messaging systems 132-1 through 132-S. If the answer at decision step 1103 is no, then call control is passed to decision step 1104 which determines if the call is still active. If the answer is yes, then control is passed back to step 1103. If the answer is no, then control is passed to step 1106 where the voice path is removed and call processing is concluded for this call.

Let us now describe the call processing which follows connector B of FIGS. 8 and 9. At decision step 1001 of FIG. 10, the presence or absence of a call coverage device is determined by examining entry 210 for the extension number 201 matching the received dialed digits when step 1001 follows step 805 and the same call coverage device determination is made for the extension number of the nearby communications device when step 1001 follows steps 906, 907, 908 or 910 of FIG. 9. If the answer at step 1001 is no, the incoming communications is connected to a voice messaging system at step 1006. If the answer at step 1001 is yes, a ringing signal is supplied to the call coverage device at step 1002 and a voice path is established at step 1004 if the call, as shown by step 1003, is answered at the call coverage device in a predetermined number of rings. If such answering does not occur at step 1003, the call is transferred at step 1006 to a voice messaging system. Step 1005 allows the person at the call coverage device to screen the call and decide at step 1007 whether or not to send the call to a voice messaging system. When the decision is yes at step 1007, the call is redirected again to a voice messaging system at step 1006 and when the decision at step 1007 is no, the person at the call coverage device can take a message from the calling party after which the voice path is removed at step 1008.

Figure 12:
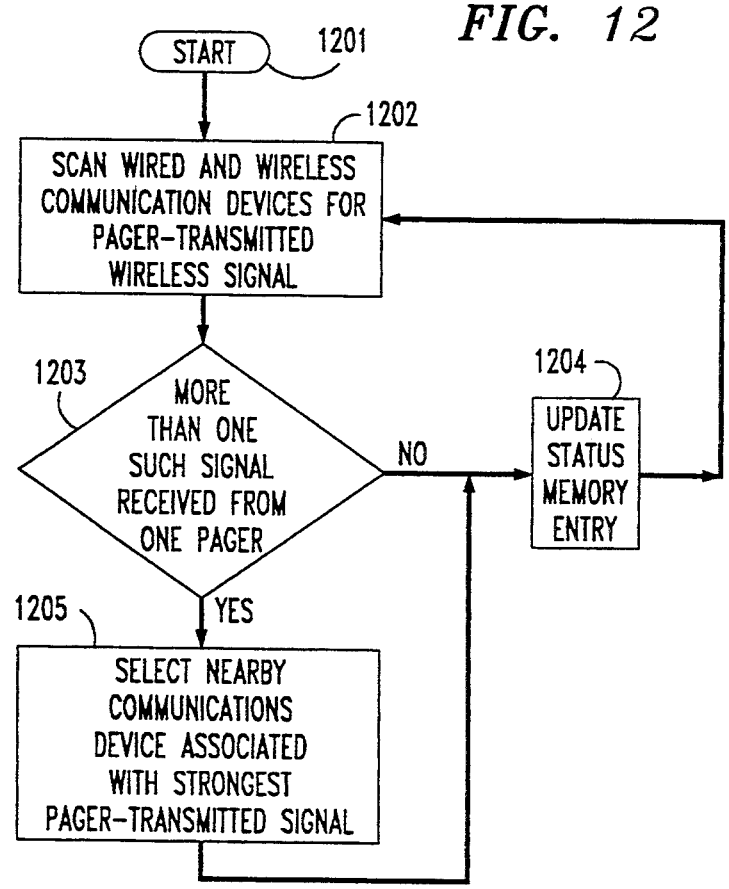

FIG. 12 is a flow chart which further describes the operation of call processor 109 of FIG. 1 when the pager communicates with the wired or wireless communications devices via the wireless paths 133. Since it is contemplated that a pager may be in communication with more than one such wired or wireless communications device when the call forwarding to a nearby communications device feature is activated, some procedure must be established to determine one of the communications devices as the nearby communications device. This is required as only one extension is permitted for entry 311 of FIG. 3. FIG. 12 shows this series of steps in one possible procedure. Such a procedure starts at step 1021 and at step 1202 the call processor scans the wired and wireless communications devices, i.e., scans their respective line interface ports for the presence of a pager-transmitted signal. At step 1203, such signals are compared to determine if there is more than one wired or wireless communications device receiving a signal from the same pager. If this is not so, then at step 1204, the status memory entry 311 is updated. If this is not so, then at step 1205, the signal strengths from the different communications devices receiving the same pager signal are compared by call processor 109 and the signal from one communications device is selected as the nearby communications device. The extension of this device is then stored in entry 311 at step 1204 which also follows step 1205. The entire process then returns to step 1202.

While the present invention has been disclosed in reference to a particular embodiment, it should be apparent that other arrangements are possible within the spirit and scope of the present invention. First, for example, while the disclosed embodiment relates to a PBX, the present invention can be implemented within other communication systems, such as the variety of switching systems disposed within a telephone central office or within a customer's premises. Second, while in the disclosed embodiment the location of a prospective called party who is moving about is determined by through the use of a pager-transmitted signal, virtually any other signal-transmitting communications device can be used in lieu of a pager. Third, while in the disclosed embodiment the pager communicates with the wired or wireless communications devices via wired or wireless paths 134 and 133, the pager could instead communicate directly with a plurality of associated line interface circuits 124 which are disposed throughout a given environment to provide the appropriate communications coverage. In such case, the location of a prospective called party could be determined by examining the characteristics of a pager-transmitted signal which is received by several different line interface circuits. A variety of well-known location techniques, such as those used in radio systems, are available for this function. Fourth, while in the disclosed embodiment the call forwarding to a nearby communications device feature forwards a call to the communications device that is nearest to the called party, this feature could also operate so as to forward a call to the communications device that is second or third, etc., nearest to the called party. Such could be desirable if the nearest communications device is busy at the time of call forwarding. Fifth, while in the disclosed embodiment an incoming communications forwarded to a nearby communications device can be directed to a voice messaging system, an electronic messaging system other than voice, i.e., text, facsimile, etc., could be the recipient of such a forwarded call. In this regard, the present invention could operate to ring the nearby communications device and then, if the call is not answered, redirect the call to a call coverage device or electronic messaging system. Or, the present invention could directly forward the call to the coverage device or messaging system upon a certain condition. This direct forwarding could be desirable, for example, when the send all calls feature is activated at the nearby communications device. Notice of such activation is readily available to the call processor from the status memory entry 305 for the nearby communications device. Sixth, while in the disclosed embodiment the pager is associated with a single pager user, this user could change over time so that the pager could be assigned to different system users at different times by merely updating the translation memory for the pager user. Lastly, while the disclosed embodiment pertains to the call forwarding of voice communications, the present-invention is also applicable to the forwarding of data communications and, in such case, the determined nearby communications device would be a device capable of receiving and, perhaps, transmitting a data signal. Therefore, the determined nearby wired or wireless communications device associated with a pager can encompass devices such as facsimile machines, video terminals, text terminals, and personal computers.

We claim:

1. A pager which signals the arrival of an incoming communications destined for a pager user, said pager comprising means for developing a plurality of signals, each signal identifying said pager and being associated with a different communications feature, a first one of these communications feature being a call forwarding feature wherein an incoming call destined for said pager user can be redirected to a communications device that is in close proximity to said pager, a second one of these features being a selective call forwarding feature wherein said call forwarding feature is only provided when said incoming communications originates from one of a predetermined number of sources, and a third one of these features being a location feature which upon being activated, identifies the pager user to said communication device such that said communication device displays the identity of said pager user, and upon being deactivated, the location feature blocks the identification of the pager user to said communication device; and means responsive to each developed signal for transmitting that developed signal to a communications system which, in response thereto regulates operation of the communications feature associated with said transmitted signal.

2. The pager of claim 1 wherein said transmitting means includes a wireless signal transmitter.

3. The pager of claim 1 wherein said transmitting means includes a connector capable of coupling the developed signal from said pager to another communications device.

4. A communications system for connecting incoming communications to communication devices, said system comprising a pager which indicates arrival of incoming communications for a pager user, said pager including means for developing a plurality of signals, each signal being associated with a user of said pager and with a different communications feature, a first one of these communications features being a call forwarding feature wherein an incoming call destined for said pager user can be redirected to a communications device that is in close proximity to said pager user, a second one of these features being a selective call forwarding feature wherein said call forwarding feature is only provided when said incoming communications originates from one of a predetermined number of sources, and a third one of these communication features being a location feature which upon being activated, provides the identification of the pager used to said communications devices participating in said incoming communications such that said communication devices display the identity of said pager user and which upon being deactivated, the location feature blocks the identification of the pager user to said participating communication devices means for receiving each developed signal and in response thereto controlling operation of the communications feature associated with said received signal for said user.

5. The communications system of claim 4 wherein said communications system is a private branch exchange.

6. The communications system of claim 4 wherein said communication system is a central office switch.

7. The communications system of claim 4 wherein said communications device is a telephone.

8. The communications system of claim 4 wherein each signal transmitted by said pager is received by those of said communications devices within a signal range of said pager.

9. The communications system of claim 4 wherein said pager transmits each signal through one of said communications devices which is interconnected thereto at a given time via a wired signal path.

10. The communications system of claim 4 wherein said pager transmits each signal through one of said communications devices which receives that transmitted signal via a wireless signal path.

11. The communications system of claim 4 wherein said receiving means compares the signal received by a plurality of communications devices.

12. The communications system of claim 4 wherein said receiving means includes a connector and said pager includes another connector which is mateable to said connector.

13. The communications system of claim 4 further including means capable of further forwarding said incoming communications destined for said user from a preferred communications device to another communications device upon a predetermined condition when said call forwarding feature is operating.

14. The communications system of claim 13 wherein said predetermined condition is that said incoming communications is not answered by said preferred communications device within a predetermined time period.

15. The communications system of claim 13 wherein said another communications device is a call coverage communications device associated with the preferred communications device.

16. The communications system of claim 15 wherein said another communications device is an electronic messaging system associated with the preferred communications device.

17. A method for use in a communications system which connects incoming communications to communications devices, said method comprising the steps of developing a plurality of signals in a pager, each signal being associated with a user of said pager and with a different communications feature, a first one of these communications features being a call forwarding feature wherein an incoming call destined for said pager user can be redirected to a communications device that is in close proximity to said pager, a second one of these features being a selective call forwarding feature wherein said call forwarding feature is only provided when said incoming communications originates from one of a predetermined number of sources, said pager being capable of changing location relative to said communication devices with time, and a third one of these features being a location feature which upon being activated, identifies the pager user to said communication device such that said communication device displays the identity of said pager user, and upon being deactivated, the location feature blocks the identification of the pager used to said communication device; and receiving each developed signal and in response thereto controlling operation of the communications feature associated with said received signal for said user.

* * * * *